United States Patent [19]
Midorikawa et al.

[11] Patent Number: 6,103,811
[45] Date of Patent: Aug. 15, 2000

[54] POLYSILOXANE-CONTAINING TIRE RUBBER COMPOSITION

[75] Inventors: Shingo Midorikawa; Fumito Yatsuyanagi; Kazunori Ishikawa, all of Hiratsuka, Japan

[73] Assignee: The Yokohama Rubber Co., Ltd., Tokyo, Japan

[21] Appl. No.: 09/068,409

[22] PCT Filed: Sep. 11, 1997

[86] PCT No.: PCT/JP97/03212

§ 371 Date: May 8, 1998

§ 102(e) Date: May 8, 1998

[87] PCT Pub. No.: WO98/11161

PCT Pub. Date: Mar. 19, 1998

[30] Foreign Application Priority Data

| Sep. 11, 1996 | [JP] | Japan | 8-240258 |
| Sep. 11, 1996 | [JP] | Japan | 8-240265 |
| Sep. 11, 1996 | [JP] | Japan | 8-240267 |
| Sep. 11, 1996 | [JP] | Japan | 8-240325 |
| Sep. 11, 1996 | [JP] | Japan | 8-240334 |
| Nov. 18, 1996 | [JP] | Japan | 8-306805 |

[51] Int. Cl.$^7$ .................................................. C08K 3/00
[52] U.S. Cl. ........................... 524/495; 524/188; 524/496
[58] Field of Search ................................... 524/495, 496, 524/188

[56] References Cited

U.S. PATENT DOCUMENTS 5,401,789  3/1995  Wolff et al. ............................. 524/188
5,665,799  9/1997  Invi et al. ................................ 524/87

FOREIGN PATENT DOCUMENTS

| 0 761 748 A2 | 3/1997 | European Pat. Off. . |
| 0 816 424 A1 | 1/1998 | European Pat. Off. . |
| 29 33 247    | 3/1980 | Germany . |
| 41 27 399 A1 | 3/1992 | Germany . |
| 56-76440     | 6/1981 | Japan . |
| 57-2346      | 1/1982 | Japan . |
| 63-199251    | 8/1988 | Japan . |
| 6-248116     | 9/1994 | Japan . |
| 8-157601     | 6/1996 | Japan . |
| WO 95/12635  | 5/1995 | WIPO . |

*Primary Examiner*—Edward J. Cain
*Attorney, Agent, or Firm*—Arent Fox Kintner Plotkin & Kahn, PLLC

[57] ABSTRACT

A rubber composition for a tire comprising:
  100 parts by weight of a starting rubber;
  10 to 150 parts by weight of a carbon black;
  0.1 to 20 parts by weight of a sulfur; and
  40 parts by weight or less of a polysiloxane
having the following alkoxysilyl group (I) or acyloxysilyl group (II) and having an average degree of polymerization of 3 to 10,000:

$$\equiv Si-OR^1 \qquad (I)$$

$$\equiv Si-OCOR^2 \qquad (II)$$

wherein $R^1$ is a substituted or unsubstituted monovalent hydrocarbon group or an organic group containing an ether bond and having 1 to 18 carbon atoms and $R^2$ is hydrogen or a hydrocarbon group having 1 to 21 carbon atoms.

15 Claims, No Drawings

POLYSILOXANE-CONTAINING TIRE RUBBER COMPOSITION

TECHNICAL FIELD

The present invention relates to a polysiloxane-containing rubber composition for a tire. More specifically, the present invention relates to a rubber composition having improved processability and productivity and also the other improved properties, suitable for use as a cord covering of a tire, carcass coat or belt cover of a tire, a bead filler, a side tread or an inner liner.

BACKGROUND ART

In pneumatic vehicle tires such as those for passenger cars, trucks, and buses, a belt layer composed of a steel cord is arranged on a carcass layer to receive the strong shock and load subjected during running of a tire. One problem to be solved in a pneumatic vehicle tire is to improve the processability of a rubber composition for covering a steel cord to improve the productivity of a tire. From this viewpoint, it has been tried to increase the amount of a process oil to be compounded or to decrease the amount of a carbon black to be compounded to decrease the viscosity of unvulcanized rubber composition. However, these proposals have the problems of decreasing the properties, such as hardness, of the vulcanized rubber. Furthermore, it may be possible to add processing aids, processing aids capable of providing the sufficient results have not been known yet.

Further, it has been tried to increase the compounding amount of a process oil and to decrease the compounding amount of a carbon black for the purpose of improving the processability and productivity of rubber compositions for carcass coat or belt cover or bead filler or further for inner liner of a pneumatic tire such as for passenger cars, trucks and buses, so as to decrease the viscosity of the unvulcanizer rubber composition. However, these processes cause the problems of decreasing the physical properties of vulcanizates such as hardness, E' (storage modulus), tanδ, although the viscosity of the unvulcanized rubber composition is decreased. Furthermore, it is also considered to use the addition of a processing aid, there are no existent processing aids, in the prior art, capable of attaining the above purpose without impairing the vulcanized physical properties.

Furthermore, as one problem to be solved in a tire for a passenger car, truck, bus etc. is to decrease the rolling resistance of a tire and also to decrease the heat generation of a tire. From this viewpoint, it has been proposed that, as a reinforcing agent for a rubber composition for a side tread of a tire, a special carbon black is used or a part of the carbon black is replaced with silica. However, when the silica is used as a reinforcing agent, there occur problems such as the mixing processability of unvulcanized rubber compounding composition and the dispersibility thereof becomes poor with the increase in the compounding amount of silica, although the rolling resistance can be decreased.

Furthermore, a rubber compounding composition containing clay (i.e., water-containing aluminum silicate) is used as a rubber for, for example, a head insulation and a white side tread of a tire such as a passenger car, truck, bus. Such a rubber composition is desired to improve the processability (e.g., the prevention of burning of rubber at, for example, extrusion step and compression step, the improvement in the production line speed) and to increase the productivity. For this purpose, although it is considered that the compounding amount of process oil is increased, or the compounding amount of carbon black is decreased, there occur problems such as the vulcanized physical properties such as hardness and strength are impaired, although the viscosity of the unvulcanized compounding composition is decreased. Furthermore, processing aids capable of attaining the above purpose is not known in the art.

DISCLOSURE OF INVENTION

Accordingly, the first object of the present invention is to eliminate the above-mentioned problems of the conventional rubber composition for covering a steel cord and to provide a rubber composition for covering a steel cord, capable of improving the processability of the unvulcanized rubber composition by the decrease in the viscosity and the extension of the scorching time and by the increase in the productivity by the shortening of the vulcanization time, without substantially impairing the properties of the vulcanizate such as the hardness, tanδ, etc.

A second object of the present invention is to eliminate the above-mentioned problems of the conventional rubber composition for carcass coat or belt cover and to provide a rubber composition for carcass coat or belt cover of tire, capable of improving the processability of the unvulcanized compounding composition by the decrease in the viscosity and the extension in the scorching time and of improving the productivity by the shortening of the vulcanization time, without substantially impairing the vulcanized physical properties such as the hardness and tanδ.

A third object of the present invention is to eliminate the above-mentioned problems of the conventional rubber composition for bead filler and to provide a rubber composition for a bead filler of a tire, capable of improving the processability of the unvulcanized compounding composition by the decrease in the viscosity and extension of scorching time, etc. and of improving the productivity by the shortening of the vulcanization time, without substantially impairing the vulcanized physical properties such as E' (storage modulus) and tanδ.

A fourth object of the present invention is to eliminate the above-mentioned problems of the conventional silica-containing rubber composition for a side tread of a tire and to provide a rubber composition for a side tread of a tire capable of improving the rolling resistance and the flex fatigue resistance, without substantially worsening the mixing processability and dispersibility of the unvulcanized rubber compounding composition even if the silica is compounded.

A fifth object of the present invention is to eliminate the above-mentioned problems of a rubber composition for an inner liner and to provide a rubber composition for an inner liner of a tire, capable of improving the processability of the unvulcanized rubber composition by the decrease in the viscosity and the extension in the scorching time and of improving the productivity by shortening the vulcanization time, without substantially impairing the vulcanized physical properties such as E' (storage modulus) and tanδ.

A sixth object of the present invention is to eliminate the above-mentioned problems of the conventional clay-containing rubber composition and is to provide a clay-containing rubber composition capable of improving the processability and productivity by the decrease in the viscosity of the unvulcanized compounding composition and by the extension of the scorching time, without substantially impairing the vulcanized physical properties such as the hardness and breaking strength.

In accordance with the present invention, there is provided a rubber composition for a tire comprising:

100 parts by weight of a starting rubber;

10 to 150 parts by weight of a carbon black;

0.1 to 20 parts by weight of a sulfur; and 40 parts by weight or less of a polysiloxane having the following alkoxysilyl group (I) or acyloxysilyl group (II) and having an average degree of polymerization of 3 to 10,000:

wherein $R^1$ is a substituted or unsubstituted monovalent hydrocarbon group or an organic group containing an ether bond and having 1 to 18 carbon atoms and $R^2$ is hydrogen or a hydrocarbon group having 1 to 21 carbon atoms.

BEST MODE FOR CARRYING OUT THE INVENTION

The starting rubber of the rubber composition for a tire according to the present invention may be any diene rubber generally used for tires in the past, for example, natural rubber (NR), polyisoprene rubber (IR), various polybutadiene rubbers (BR), various styrene-butadiene copolymer rubbers (SBR). These diene rubbers may be used alone or in any blends thereof.

The polysiloxane containing the alkoxysilyl groups (I) or acyloxysilyl groups (II) compounded in the rubber composition according to the present invention, as mentioned above, must have an alkoxysilyl group (I) or acyloxysilyl group (II) be a polymer (or oligomer) having an average degree of polymerization of 3 to 10,000, preferably 10 to 1,000. Accordingly, in the polysiloxane of the present invention, it is essential that a $\equiv$Si—O— $R^1$ group or $\equiv$Si—OCOR group be present. These groups may be at the main chain, side chains, or ends. Further, a hydrogen group or other organic groups are also possible. In addition, the presence of at least 6 $OR^1$ group and $OCOR^2$ group in the molecule thereof, namely at least 6 alkoxy and acyloxy groups preferably directly bonded to the Si atom in the main chain in one molecule thereof. The polysiloxane usable in the present invention preferably has at least one hydrocarbon group, preferably alkyl group directly bonded to the Si atom in the molecule thereof in view of the affinity thereof with the rubber component. The polysiloxane is a known substance. For example, it may be manufactured as follows:

The polysiloxane containing an alkoxysilyl or acyloxysilyl group is synthesized by reacting an Si—H group-containing polysiloxane and alcohol or carboxylic acid in the presence of a catalyst.

As the $\equiv$Si—H group containing polysiloxane, the following may be illustrated.

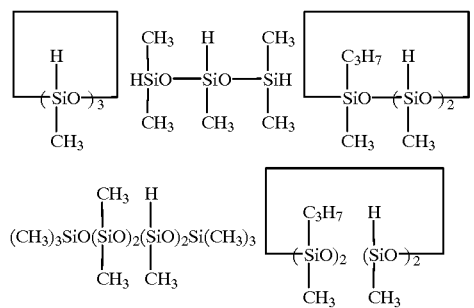

-continued

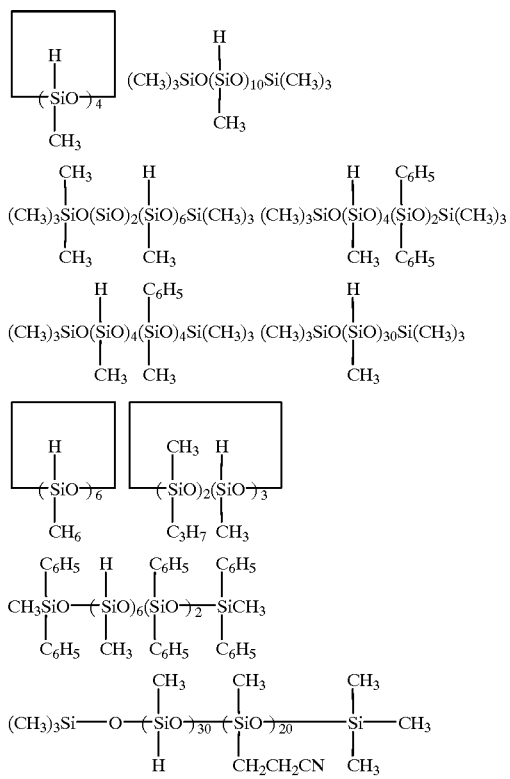

As the above-mentioned alcohol, methanol, ethanol, propanol, butanol, pentanol, heptanol, octanol, octadecanol, phenol, benzyl alcohol, etc., and also alcohols having oxygen atoms such as ethylene glycol monomethyl ether, diethylene glycol monomethyl ether may be illustrated.

As the carboxylic acid, acetic acid, propionic acid, palmitic acid, stearic acid, myristic acid, etc. may be mentioned.

As the catalyst, chloroplatinic acid, platinum-ether complexes, platinum-olefin complexes, $PdCl_2$ $(PPh_3)_2$, $RhCl_2$ $(PPh_3)_2$ may be used. The corresponding $\equiv$Si—H group-containing polysiloxane and alcohol or carboxylic acid are reacted in the presence of the catalyst for synthesis.

As the method for introducing the organic group, introduction is easily carried out by reacting $\equiv$Si—H and an organic compound having a double bond using the above catalyst. As a compound having a double bond, there are styrene, α-methylstyrene, α-methylstyrene dimer, limonene, vinylcyclohexene, etc.

As another method, synthesis is possible by causing a reaction between a corresponding $\equiv$Si—H group-containing polysiloxane and a double bond-containing alkoxysilane as shown below in the presence of the above catalyst:

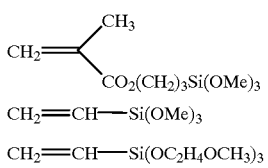

$CH_2$=CH—$Si(OMe)_3$ $CH_2$=CH—$Si(OC_2H_4OCH_3)_3$

As still another method, the polysiloxane used in the present invention may be synthesized by reacting a silanol terminal polysiloxane and an alkoxysilane in the presence of a catalyst, for example, a bivalent tin compound. Examples of such a silanol terminal polysiloxane are:

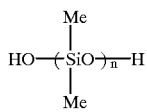

wherein n is 1 to 2000.

Examples of the alkoxysilane are the following alkoxysilanes. Further, the silane coupling agents shown in Table I are exemplified.

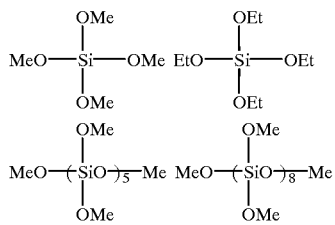

TABLE I

| Chemical name | Structural formula |
| --- | --- |
| Vinyltrimethoxysilane | $CH_2$=$CHSi(OCH_3)_3$ |
| Vinyltriethoxysilane | $CH_2$=$CHSi(OCH_2CH_3)_3$ |
| Vinyltris(2-methoxyethoxy)silane | $CH_2$=$CHSi(OCH_2CH_2OCH_3)_3$ |
| N-(2-aminoethyl)3-aminopropylmethyl-dimethoxysilane | $H_2NCH_2CH_2NH(CH_2)_3Si(OCH_3)_2$<br>                                            $CH_3$ |
| N-(2-aminoethyl)3-aminopropyltrimethoxysilane | $H_2NCH_2CH_2NH(CH_2)_3Si(OCH_3)_3$ |
| 3-aminopropyltrimethoxysilane | $H_2N(CH_2)_3Si(OCH_3)_3$ |
| 3-glycidoxypropyltrimethoxysilane | $CH_2\underset{O}{\diagdown\!\diagup}CHCH_2O(CH_2)_3Si(OCH_3)_3$ |
| 3-glycidoxypropylmethyldimethoxysilane | $CH_2\underset{O}{\diagdown\!\diagup}CHCH_2O(CH_2)_3Si(OCH_3)_2$<br>                                                $CH_3$ |
| 2-(3,4-epoxycyclohexyl)ethyl-trimethoxysilane | (epoxycyclohexyl)$CH_2CH_2Si(OCH_2)_3$ |
| 3-methacryloxypropyl-trimethoxysilane | $CH_2$=$CCO_2(CH_2)_3Si(OCH_3)_3$<br>       $CH_3$ |
| 3-mercaptopropyl-trimethoxylsilane | $HS(CH_2)_3Si(OCH_3)_3$ |
| 3-aminopropyl-triethoxysilane | $H_2N(CH_2)_3Si(OCH_2CH_3)_3$ |
| bis-[3-(triethoxysilyl)-propyl]tetrasulfide | $[(CH_3CH_2O)_3Si(CH_2)_3]_2S_4$ |

The polysiloxane usable in the present invention may further be synthesized by a reaction between polysiloxane having a reactive functional group at its side chain or terminal and a silane coupling agent of Table I. Examples of the polysiloxane having a reactive functional group, are an epoxy group, amine group, mercapto group, carboxyl group, etc.

Note that the polysiloxane used in the present invention, as explained above, is not particularly limited in its terminal groups and side chains and is determined by the type of the starting material used during manufacture.

The compounding amount of the polysiloxane used in the present invention is 40 parts by weight or less, preferably 0.01 to 20 parts by weight, more preferably 0.1 to 10 parts by weight, particularly preferably 0.1 to 8 parts by weight, based on 100 parts by weight of the diene rubber in the rubber composition. When the content of the polysiloxane is too small, the desired effects cannot be obtained, whereas if too large, polysiloxanes not bonding with the silica will leak out from the vulcanized product in some cases.

In the present invention, when silica is compounded into the above rubber composition, silane coupling agents may be further compounded. The silane coupling agent usable in the present invention may be any silane coupling agent used together with silica fillers in the past. The typical examples thereof are shown in Table I. Of these, bis-[3-(triethoxysilica)-propyl]tetrasulfide is most preferred from the viewpoint of the processability. Further, the following special sulfur-containing silane coupling agents shown in Table II below can also be used.

TABLE II

| Chemical name | Structural formula |
| --- | --- |
| 3-Trimethoxysilylpropyl-N,N-dimethyl thiocarbamoyl-tetrasulfide | $(CH_3O)_3SiC_3H_6S_4CN\underset{S}{\overset{\parallel}{\diagdown}}\begin{matrix}CH_3\\CH_3\end{matrix}$ |
| Trimethoxysilylpropyl-mercaptobenz-thiazole tetrasulfide | $(CH_3O)_3SiC_3H_6S_4$—benzothiazole |
| Thiethoxysilylpropyl-methacrylate-monosulfide | $(C_2H_5O)_3SiC_3H_6SCC\underset{O}{\overset{CH_3}{\mid}}$—$CH_3$ |
| Dimethoxymethylsilyl-propyl-N,N-dimethylthiocarbamoyl-tetrasulfide | $(CH_3O)_2SiC_3H_6S_4CN\underset{S}{\overset{\parallel}{\diagdown}}\begin{matrix}CH_3\\CH_3\end{matrix}$<br>     $CH_3$ |

According to the first embodiment of the present invention, there is provided a rubber composition for covering a steel cord comprising 100 parts by weight of a diene rubber containing 40 parts by weight or more of natural rubber, 2 to 10 parts by weight of sulfur and 10 parts or less of the above polysiloxane having an average degree of polymerization of 3–10000.

According to the preferred embodiment of the first embodiment of the present invention, the rubber composition for covering a steel cord, in which 0 to 2 parts by weight, in terms of a Co element, of a cobalt salt of an organic acid is contained in the composition.

According to the preferred embodiment of the first embodiment of the present invention, the rubber composition for covering a steel cord, wherein the composition further contains 1.0 to 5 parts by weight of partial self-condensation product of hexamethylolmelamine pentamethyl ether and 0.5 to 5 parts by weight of a cresol resin.

As the rubber component of the rubber composition used in the rubber composition for covering steel cord according to the first embodiment of the present invention, conventional diene rubber (e.g., natural rubber (NR), polyisoprene rubber (IR), polybutadiene rubber (BR), styrene-butadiene copolymer rubber (SBR), etc.) are used. The use of natural rubber having a high tensile strength is most preferable and, in the present invention, among 100 parts by weight of diene rubber, 40 parts by weight or more, more preferably 80 parts by weight or more, of natural rubber is preferably used.

As the reinforcing agent compounded in the rubber composition according to the first embodiment of the present invention, carbon black or carbon black and silica can be used. As the carbon black, any carbon black conventionally used as a carbon black for tires (e.g., carbon blacks obtained by, for example, oil furnace method) can be used. The amount of the carbon black compounded is as mentioned above, but preferably 30 to 80 parts by weight, based upon 100 parts by weight of the diene rubber. Furthermore, silica (and optionally a silane coupling agent) can be used instead of the carbon black and the addition of silica is preferable because the heat generation is decreased and the belt durability is improved.

According to the first embodiment of the present invention, for the purpose of improving the processability, while the anti-water adhesive resistance and the anti-cracking property are improved, the polymer (or oligomer) having the above alkoxysilyl group and/or acyloxysilyl group having the formula (I) and/or (II) and having an average degree of polymerization of 3–10000, preferably 10–1000 is compounded preferably in an amount of 10 parts by weight or less, more preferably in an amount of 0.1–8 parts by weight, based upon 100 parts by weight of the diene rubber.

When the silane coupling agent is compounded into the rubber composition used in the first embodiment of the present invention, the amount of the silane coupling agent can be decreased when compared with the prior art and the abrasion resistance can be further improved. The preferable amount of the silane coupling agent according to the present invention is 40% by weight or less, more preferably 0.5 to 20% by weight, based upon the amount of the silica compounded in the rubber composition. When the amount of the silane coupling agent is too small, the desired effects are difficult to obtain, whereas when the amount is too large, it is not preferable because the burns of rubber (scorching) are likely to occur during the mixing and extrusion steps.

In the rubber composition for steel cord cover according to the first embodiment of the present invention, preferably 2–10 parts by weight, more preferably 4–10 parts by weight of sulfur, based upon 100 parts by weight of the diene rubber, is compounded. The sulfur usable in the present invention can be any sulfur, which is conventionally used in the rubber composition. The amount of sulfur is too small, the adhesiveness to the metal becomes insufficient, whereas if too large, the changes in the physical properties after aging becomes large and it is unpreferably likely to decrease the durability.

In the rubber composition for steel cord cover according to the first embodiment of the present invention, 0–2 parts by weight, preferably 0.1–1 part by weight, in terms of Co element, based upon 100 parts by weight of the diene rubber, of a cobalt salt of an organic acid is compounded, whereby the adhesiveness is increased. However, when the amount of the cobalt salt of an organic acid is too large, the further improvement in the adhesiveness cannot be obtained.

Examples of the cobalt salt of an organic acid compounded in the rubber composition according to the first embodiment of the present invention are cobalt salts of linear or branched monocarboxylic acids having 5 to 20 carbon atoms such as cobalt naphthenate, cobalt stearate, cobalt octylate, cobalt oleate etc.

As mentioned above, in the preferable embodiment of the first embodiment, 1.0–5 parts by weight of the partial self-condensation product and 0.5 to 5 parts by weight of cresol resin are compounded to improve the hardness and anti-water adhesiveness. These additives are known in the art and are available as follows. For example Sumicanol 507 (50% of partial condensate of hexamethylolmelamine pentamethyl ether is contained, Sumitomo Chemical) and furthermore, Sumicanol 610 (methacresol resin, Sumitomo Chemical) are available.

According to the second embodiment of the present invention, there is provided a rubber composition for a tire carcass coat or belt cover comprising 100 parts by weight of a diene rubber containing 40 parts by weight or more of natural rubber, 20 to 120 parts by weight of a carbon black preferably having a nitrogen specific surface area of 60 m²/g or less and 10 parts by weight or less of a polysiloxane having the following alkoxysilyl group (I) or acyloxysilyl group (II) and having an average degree of polymerization of 3 to 10,000:

  (I)

  (II)

wherein $R^1$ is a substituted or unsubstituted monovalent hydrocarbon group or an organic group containing an ether bond and having 1 to 18 carbon atoms and $R^2$ is hydrogen or a hydrocarbon group having 1 to 21 carbon atoms.

As the rubber component of the rubber composition used in the rubber composition for a tire carcass coat or belt cover according to the second embodiment of the present invention, conventional diene rubber (e.g., natural rubber (NR), polyisoprene rubber (IR), polybutadiene rubber (BR), styrene-butadiene copolymer rubber (SBR), etc.) are used. The use of natural rubber having a high tensile strength is most preferable and, in the present invention, among 100 parts by weight of diene rubber, 40 parts by weight or more, more preferably 60 parts by weight or more, of natural rubber is preferably used.

As the carbon black compounded in the rubber composition according to the second embodiment of the present invention, among carbon blacks conventionally used as a carbon black for tires (e.g., carbon blacks obtained by, for example, oil furnace method), those having a nitrogen specific surface area ($N_2SA$) (determined by method C of ASTM-D3037-78) of 60 m²/g or less, preferably 20–50 m²/g are used from the viewpoint of the heat generation. The nitrogen specific surface area of the carbon black of more than 60 m²/g causes the increase in tanδ and this is not preferable because the heat generation tends to be worsen.

The amount of the carbon black compounded in the rubber composition used in the second embodiment of the present invention is preferably 20–120 parts by weight, more preferably 20–80 parts by weight, based upon 100 parts by weight of the diene rubber. When the compounding amount of the carbon black is too small, unpreferably the tensile strength and the physical properties at break are possibly decreased. Contrary to this, when the compounding amount of the carbon black is too large, it is not preferable because the viscosity of the rubber compounding product is increased and therefore the processability becomes poor and the heat generation is increased.

In the rubber composition according to the second embodiment of the present invention; any silica, which is conventionally compounded in a rubber composition, can be compounded, instead of a part of the carbon black, in the rubber composition according to the second embodiment of the present invention and a silane coupling agent can be used together with the silica.

According to the second embodiment of the present invention, the polymer (or oligomer) having the alkoxysilyl group and/or acyloxysilyl group having the above formula (I) and/or (II) and having an average degree of polymerization of 3–10000, preferably 10–1000 is compounded preferably in an amount of 10 parts by weight or less, more preferably in an amount of 0.1–8 parts by weight, based upon 100 parts by weight of the diene rubber, in the rubber composition for a tire carcass coat or cover.

When the silane coupling agent is compounded into the rubber composition used in the second embodiment of the present invention, the amount of the silane coupling agent, the preferable amount of the silane coupling agent is 40% by weight or less, more preferably 0.5 to 20% by weight, based upon the amount of the silica compounded in the rubber composition. When the amount of the silane coupling agent is too large, it is not preferable because the burns of rubber (scorching) are likely to occur during the mixing and extrusion steps.

According to the third embodiment of the present invention, there is provided a rubber composition for a tire bead filler comprising 100 parts by weight of a diene rubber containing 40 parts by weight or more of natural rubber, 50 parts by weight or more of carbon black having a nitrogen specific surface area of 100 $m^2/g$ or less and 10 parts by weight or less of the above polysiloxane containing the above alkoxysilyl group (I) or acyloxysilyl group (II) and having an average degree of polymerization of 3–10000.

As the rubber component of the rubber composition used in the rubber composition for a tire bead filler according to the third embodiment of the present invention, conventional diene rubber (e.g., natural rubber (NR), polyisoprene rubber (IR), polybutadiene rubber (BR), styrene-butadiene copolymer rubber (SBR), etc.) are used. The use of natural rubber having a high tensile strength is most preferable and, in the present invention, among 100 parts by weight of diene rubber, 40 parts by weight or more, more preferably 70 parts by weight or more, of natural rubber is preferably used.

As the carbon black compounded in the rubber composition according to the third embodiment of the present invention, among carbon blacks conventionally used as a carbon black for tires (e.g., carbon blacks obtained by, for example, oil furnace method), those having a nitrogen specific surface area ($N_2SA$) (determined by method C of ASTM-D3037-78) of 100 $m^2/g$ or less, preferably 70–90 $m^2/g$ are used from the viewpoint of the heat generation. The nitrogen specific surface area of the carbon black of more than 100 $m^2/g$ causes the increase in tan$\delta$ and this is not preferable because the heat generation tends to be worsen.

The amount of the carbon black compounded in the rubber composition used in the third embodiment of the present invention is preferably 50–120 parts by weight, more preferably 55–80 parts by weight, based upon 100 parts by weight of the diene rubber. When the compounding amount of the carbon black is too small, unpreferably the tensile strength and the physical properties at break are possibly decreased. Contrary to this, when the compounding amount of the carbon black is too large, it is not preferable because the viscosity of the rubber compounding product is increased and therefore the processability becomes poor and the heat generation is increased.

In the rubber composition according to the present invention; any silica, which is conventionally compounded in a rubber composition, can be compounded, instead of a part of the carbon black, in the rubber composition according to the third embodiment of the present invention and a silane coupling agent can be used together with the silica. The compounding of the silica is preferable because the heat generation is decreased and the durability is improved.

According to the third embodiment of the present invention, the polymer (or oligomer) having the alkoxysilyl group and/or acyloxysilyl group having the above formula (I) and/or (II) and having an average degree of polymerization of 3–10000, preferably 10–1000 is compounded preferably in an amount of 10 parts by weight or less, more preferably in an amount of 0.1–8 parts by weight, based upon 100 parts by weight of the diene rubber, in the rubber composition for a tire bead filler.

When the silane coupling agent is compounded into the rubber composition used in the third embodiment of the present invention, the amount of the silane coupling agent, the preferable amount of the silane coupling agent is 40% by weight or less, more preferably 0.5 to 20% by weight, based upon the amount of the silica compounded in the rubber composition. When the amount of the silane coupling agent is too large, it is not preferable because the burns of rubber (scorching) are likely to occur during the mixing and extrusion steps.

According to the fourth embodiment of the present invention, there is provided a rubber composition for a tire side tread comprising 100 parts by weight of a diene rubber containing 40 parts by weight or more of polybutadiene, preferably 0–50 parts by weight, more preferably 5–50 parts by weight of silica and preferably 10–60 parts by weight of carbon black, provided that the total amount of the silica and the carbon black is 20–80 parts by weight, and the polysiloxane having the above alkoxysilyl group (I) or acyloxysilyl group (II) such that at least 6 alkoxy groups or at least 2 acyloxy groups, directly bonded to the Si atom are present in the molecule thereof and having an average degree of polymerization of 3–10,000 in an amount of 40% by weight or less, based upon the amount of the silica.

According to the fourth embodiment of the present invention, 40% by weight or less of, based upon the compounding amount of silica, a silane coupling agent is further compounded in the rubber composition for the side tread.

As the rubber component of the rubber composition used in the rubber composition for the side tread according to the fourth embodiment of the present invention, conventional diene rubber (e.g., natural rubber (NR), polyisoprene rubber (IR), polybutadiene rubber (BR), styrene-butadiene copolymer rubber (SBR), etc.) are used. However, the use of the diene rubber containing 40 parts by weight or more of polybutadiene based upon 100 parts by weight of the total diene rubber is preferable for the side tread of a tire.

The silica compounded in the rubber composition to be used in the fourth embodiment of the present invention may be any silica conventionally used for a tire (e.g., silicic acid hydrate obtained by a dry or wet process, nitrogen specific surface area 50–300 $m^2/g$ silica). The compounding amount of the silica is 5–50 parts by weight, preferably 10–40 parts by weight, based upon 100 parts by weight of the rubber. When the compounding amount of the silica is too small, the sufficient decrease in the rolling resistance cannot be obtained. Contrary to this, when the amount of the silica is too small, it is not preferable because the physical properties such as the tensile strength, physical properties at break are possibly decreased.

As the carbon black compounded in the rubber composition according to the fourth embodiment of the present invention, any carbon blacks conventionally used as a carbon black for tires (e.g., carbon blacks obtained by, for example, oil furnace method) are used. The preferable carbon blacks usable in the present invention are those having a nitrogen specific surface area ($N_2SA$) (determined by method C of ASTM-D3037-78) of 100 $m^2/g$ or less, preferably 30–90 $m^2/g$ and a DBP oil absorption (determined by a method according to ASTM-D-3493) of 70 ml/100 g or more, more preferably 80–130 ml/100 g, from the viewpoint of the abrasion resistance.

The amount of the carbon black compounded in the rubber composition used in the fourth embodiment of the present invention is preferably 10–60 parts by weight, more preferably 20–50 parts by weight, based upon 100 parts by weight of the diene rubber. In addition, the total compounding amounts of the carbon black and the silica are preferably 20–80 parts by weight, more preferably 30–60 parts by weight. When the compounding amount of the carbon black is too small, unpreferably the tensile stress at elongation and the physical properties at break are possibly decreased. Contrary to this, when the compounding amount of the carbon black is too large, it is not preferable because the viscosity of the rubber compounding product is increased and therefore the processability becomes poor and the heat generation is increased.

According to the fourth embodiment of the present invention, the polymer (oligomer) having the alkoxysilyl group and/or acyloxysilyl group represented by the formula (I) and/or (II) and having an average degree of polymerization of 3–10000, preferably 10–1000 is compounded in an amount of 40% by weight or less, preferably 0.5–20% by weight, based upon the compounding amount of silica.

As mentioned above, although the vulcanized physical properties of the side tread of a tire having the silica are good, there are disadvantages that the processability during the unvulcanized state is poor. In accordance with our understandings, this is due to the presence of the silanol group ($\equiv$Si—OH) present on the surface of the silica. Namely, the structural product is formed in the rubber composition due to the cohesive power of the silanol group to thereby increase the viscosity, the vulcanization accelerator etc. are adsorbed due to the polarity of the silanol group to thereby delay the vulcanization, and the kneading performance of the mixing is decreased due to the insufficient compatibility with non-polar rubber. For these phenomena, the processability of the unvulcanized rubber composition is decreased. Furthermore, a silane coupling agent is often used, in combination with the silica in the silica-compounding rubber composition for the purpose of the reinforcement of rubber. In such a case, since the silanol groups present in the inner pores of silica powder particles are interacted with the silane coupling agent, whereby the silane coupling agent is lost and the reinforcing effects are decreased, and therefore, a larger amount of the silane coupling agent should be disadvantageously compounded. As in the prior art, when a polar substance such as diethylene glycol is added thereto, the adsorption of, a polar additive such as a vulcanization accelerator can be prevented to a certain extent, but this phenomenon cannot be completely prevented and the bonding of a substance such as a silane coupling agent, which should be chemically bonded to the silica particles, to the inner pores of the silica cannot be prevented.

Nevertheless, according to the fourth embodiment of the present invention, since the polysiloxane having the alkoxysilyl group or acyloxysilyl group represented by the above formula (I) or (II) is compounded in a rubber composition, the alkoxysilyl group (I) or the acyloxysilyl group (II) is reacted with the silanol group to thereby cover the surface of the filler particles, and therefore, the problems of the prior art are completely solved. Thus, the increase in the viscosity of the unvulcanized rubber composition caused by the cohesive power and polarity of the silanol group and the wasteful consumption of, for example, polar additives such as a vulcanization accelerator or a silane coupling agent can be effective suppressed.

When the silane coupling agent is compounded into the rubber composition used in the fourth embodiment of the present invention, the amount of the silane coupling agent can be decreased when compared with the prior art and the abrasion resistance can be further improved. The preferable amount of the silane coupling agent according to the present invention is 40% by weight or less, more preferably 1 to 20% by weight, based upon the amount of the silica compounded in the rubber composition. When the amount of the silane coupling agent is too small, the desired effects are difficult to obtain, whereas when the amount is too large, it is not preferable because the burns of rubber (scorching) are likely to occur during the mixing and extrusion steps.

According to the fifth embodiment of the present invention, there is provided a rubber composition for an inner liner rubber comprising 100 parts by weight of a rubber component containing 50 parts by weight or more of butyl rubber and 50 parts by weight or less of a diene rubber, preferably 20 to 120 parts by weight of a carbon black having a nitrogen specific surface area of 60 $m^2/g$ or less, and preferably 10 parts by weight or less of polysiloxane having the above alkoxysilyl group (I) or acyloxysilyl group (II) and having an average degree of polymerization of 3–10000.

As the rubber component of the rubber composition used in the rubber composition for an inner liner of a tire according to the fifth embodiment of the present invention, conventional diene rubber (e.g., natural rubber (NR), polyisoprene rubber (IR), polybutadiene rubber (BR), styrene-butadiene copolymer rubber (SBR), etc.) and a butyl rubber (IIR) compounded thereto are used. In the present invention, in order to keep the air holding property the butyl rubber should be compounded in an amount of 50 parts by weight or more, preferably 70 parts by weight or more, based upon 100 parts by weight of the rubber content. As the other rubber component, in view of the flex resistance, the use of diene rubber, especially natural rubber (NR), polyisoprene rubber (IR), polybutadiene rubber (BR), styrene-butadiene copolymer rubber (SBR), etc. is preferable.

As the carbon black compounded in the rubber composition according to the fifth embodiment of the present invention, among carbon blacks conventionally used as a carbon black for tires (e.g., carbon blacks obtained by, for example, oil furnace method), those having a nitrogen specific surface area ($N_2SA$) (determined by method C of ASTM-D3037-78) of 60 $m^2/g$ or less, preferably 20–40 $m^2/g$ are used from the viewpoint of the heat generation. The nitrogen specific surface area of the carbon black of more than 60 $m^2/g$ causes the increase in tan$\delta$ and this is not preferable because the heat generation tends to be worsen.

The amount of the carbon black compounded in the rubber composition used in the fifth embodiment of the present invention is preferably 20 to 120 parts by weight, more preferably 30 to 70 parts by weight, based upon 100 parts by weight of the rubber component. When the compounding amount of the carbon black is too small, there is a case where the stress during elongation and the physical properties at break are unpreferably decreased. Contrary to this, when the amount of carbon black is too large, it is not preferable that the viscosity of the rubber compounding composition is likely increased to cause the poor processability and the heat generation becomes high.

In the rubber composition according to the fifth embodiment of the present invention, silica conventionally used in a rubber composition can be used, as a reinforcing agent, instead of a part of the carbon black and a silane coupling agent can be used, together with the silica.

According to the fifth embodiment of the present invention, in the rubber composition for a tire inner liner, the polymer (or oligomer) having the alkoxysilyl group and/or acyloxysilyl group having the above formula (I) and/or (II) and having an average degree of polymerization of 3–10000, preferably 10–1000 is compounded preferably in an amount of 10 parts by weight or less, more preferably in an amount of 0.1–8 parts by weight, based upon 100 parts by weight of the rubber component.

When the silane coupling agent is compounded into the rubber composition used in the fifth embodiment of the present invention, the amount of the silane coupling agent is 40% by weight or less, more preferably 1 to 20% by weight, based upon the amount of the silica compounded in the rubber composition. When the amount of the silane coupling agent is too large, it is not preferable because the burns of rubber (scorching) are likely to occur during the mixing and extrusion steps.

According to a sixth embodiment of the present invention, there is provided a clay compounding rubber composition comprising 5 to 100 parts by weight, based upon 100 parts by weight of the starting rubber, of clay and 40 parts by weight or less, of polysiloxane based upon the amount of the clay, having the above alkoxysilyl group and/or acyloxysilyl group having the formula (I) or (II) and having an average degree of polymerization of 3–10000.

The rubber component of the clay-compounding rubber composition for a tire according to the sixth embodiment of the present invention is not specifically limited, and therefore, conventional diene rubber such as natural rubber (NR), polyisoprene rubber (IR), polybutadiene rubber (BR), styrene-butadiene copolymer rubber (SBR) acrylonitrile-butadiene copolymer rubber (NBR, etc.) are used. In addition, as in the case of a rubber for white side tread, when the weather resistance is especially required, ethylene-propylene-diene terpolymer rubber (EPDM) and butyl rubber (IIR) are preferably compounded as a part of the rubber component.

The clay compounded in the rubber composition according to the sixth embodiment of the present invention may be any conventional clays used for a tire (e.g., kaoline clay mainly composed of aluminum silicate hydrate celsite clay, pyroferite clay, etc.). The compounding amount of clay is 5–100 parts by weight, preferably 20–60 parts by weight, based upon 100 parts by weight. When the compounding amount of clay is too small, the balance between the hardness and the physical properties at break becomes worse. Contrary to this, when the amount is too large, it is not preferable that the viscosity of the rubber compounding composition is increased, whereby the processability is possibly worsen.

In the clay-compounding rubber composition according to the sixth embodiment of the present invention, any conventional carbon black used for a tire can be used and the compounding amount thereof is preferably 50–90 parts by weight, based upon 100 parts by weight of rubber.

In the clay-compounding rubber composition according to the sixth embodiment of the present invention, the polymer (or oligomer) having the alkoxysilyl group and/or acyloxysilyl group having the above formula (I) and/or (II) and having an average degree of polymerization of 3–10000, preferably 10–1000 is compounded in an amount of 40% by weight, preferably 0.5 to 20% by weight, based upon the compounding amount of the clay.

Namely, according to the sixth embodiment of the present invention, since the alkoxysilyl group (I) or acyloxysilyl group (II) is reacted with the moiety of silicic acid hydrate in the clay by compounding, into the rubber composition, the polysiloxane having the alkoxysilyl group (I) or acyloxysilyl group (II), the non-polarity of the silicic acid hydrate moiety is made polarity, the anti-cracking property and the processability of the clay-compounding rubber composition can be improved.

When the silane coupling agent is compounded into the rubber composition used in the sixth embodiment of the present invention, the amount of the silane coupling agent can be decreased when compared with the prior art and the abrasion resistance can be further improved. The preferable amount of the silane coupling agent according to the present invention is 40% by weight or less, more preferably 0.5 to 20% by weight, based upon the amount of the silica in the rubber composition.

The rubber composition according to the present invention may contain, in addition to the above-mentioned essential ingredients, a vulcanization or cross-liking agent, a vulcanization or cross-linking accelerator, various types of oils, an antiaging agent (or antioxidant), plasticizer, or other various additives generally compounded in general rubbers. The compounding compositions are kneaded and vulcanized by general methods to make the composition which may then be used for vulcanization or cross-linking. The amounts of these additives added may be made the amounts generally added in the past so long as they do not run counter to the object of the present invention.

EXAMPLES

The present invention will now be further illustrated by, but the technical scope thereof is by no means limited to, the following Examples.

Example I-1 to I-8 and Comparative Examples I-1 to I-5

The polysiloxanes used in the present invention were synthesized by the following general methods:

Polysiloxane 1

100 g of polymethylhydrogensiloxane (KF99, made by Shinetsu Chemical Industry) and 60 g of methanol were mixed, 40 $\mu$l of 1% isopropyl alcohol solution of chloroplatinic acid was added, and a reaction was carried out at 80° C. for 10 hours. The estimated structure of the resultant compound is as follows.

Polysiloxane 2

100 g of polymethylhydrogensiloxane (KF99, made by Shinetsu Chemical Industry) and 72 g of ethanol were mixed, 40 $\mu$l of 1% isopropyl alcohol solution of chloroplatinic acid was added, and a reaction was carried out at 80° C. for 10 hours. The estimated structure of the resultant compound is as follows.

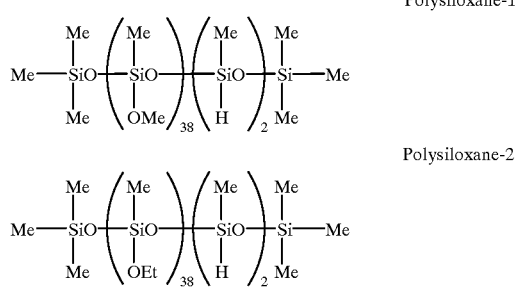

Polysiloxane-1

Polysiloxane-2

The other compounding components used in the compounding of each Example of the following Examples and Comparative Examples (see Table III) (parts by weight) were the following commercially available products.

TABLE III

| | (wt. parts) | | | | |
|---|---|---|---|---|---|
| | Comp. Example I-1 | Example I-1 | Example I-2 | Comp. Example I-2 | Example I-3 |
| NR (Natural Rubber) | 100 | 100 | 100 | 100 | 100 |
| Carbon black | 63 | 63 | 63 | 63 | 63 |
| Silica | — | — | — | — | — |
| Silane coupling agent | — | — | — | — | — |
| Active agent | — | — | — | — | — |
| Polysiloxane-1 | — | 2.0 | 4.0 | — | 1.0 |
| Polysiloxane-2 | — | — | — | — | — |
| Silicone oil | — | — | — | — | — |
| Aromatic oil | 4.0 | 2.0 | — | 4.0 | 3.0 |
| Zinc oide | 10.0 | 10.0 | 10.0 | 10.0 | 10.0 |
| Antioxidant | 1.0 | 1.0 | 1.0 | 1.0 | 1.0 |
| Cobalt naphthenate | 3.0 | 3.0 | 3.0 | 3.0 | 3.0 |
| Sulfur | 8.0 | 8.0 | 8.0 | 8.0 | 8.0 |
| Vulcanization accelerator | 0.5 | 0.5 | 0.5 | 0.5 | 0.5 |
| Cresol resin | — | — | — | 1.0 | 1.0 |
| Partial condensate of hexamethylol melamine pentamethyl ether | — | — | — | 5.0 | 5.0 |
| Mooney viscosity | 65 | 59 | 54 | 63 | 61 |
| Scorching time (min) | 28 | 30 | 32 | 29 | 30 |
| Vulcanization rate (min) | 10.8 | 10.3 | 9.9 | 11.9 | 11.5 |
| Hs (20° C.) | 73 | 73 | 73 | 80 | 80 |
| tanδ (60° C.) | 0.19 | 0.19 | 0.19 | 0.20 | 0.20 |
| Initial adhesiveness (%) | 95 | 95 | 95 | 95 | 95 |
| Adhesiveness against hot water (%) | 66 | 70 | 70 | 80 | 85 |

| | (wt. parts) | | | |
|---|---|---|---|---|
| | Example I-4 | Example I-5 | Example I-6 | Example I-7 |
| NR (Natural Rubber) | 100 | 100 | 100 | 100 |
| Carbon black | 63 | 63 | 63 | 43 |
| Silica | — | — | — | 20 |
| Silane coupling agent | — | — | — | 1.0 |
| Active agent | — | — | — | 1.3 |
| Polysiloxane-1 | 2.0 | 4.0 | — | 2.0 | — |
| Polysiloxane-2 | — | — | 2.0 | — |

TABLE III-continued

| Silicone oil | — | — | — | — |
|---|---|---|---|---|
| Aromatic oil | 2.0 | — | 2.0 | 1.0 |
| Zinc oxide | 10.0 | 10.0 | 10.0 | 10.0 |
| Antioxidant | 1.0 | 1.0 | 1.01.0 | |
| Cobalt naphthenate | 3.0 | 3.0 | 3.0 | 3.0 |
| Sulfur | 8.0 | 8.0 | 8.0 | 8.0 |
| Vulcanization accelerator | 0.5 | 0.5 | 0.5 | 0.5 |
| Cresol resin | 1.0 | 1.0 | 1.0 | 1.0 |
| Partial condensate of hexamethylol melamine pentamethyl ether | 5.0 | 5.0 | 5.0 | 5.0 |
| Mooney viscosity | 58 | 54 | 59 | 59 |
| Scorching time (min) | 3 | 32 | 31 | 31 |
| Vulcanization rate (min) | 11.2 | 10.7 | 11.3 | 11.6 |
| Hs (20° C.) | 80 | 80 | 80 | 80 |
| tanδ (60° C.) | 0.20 | 0.20 | 0.20 | 0.16 |
| Initial adhesiveness (%) | 95 | 95 | 95 | 95 |
| Adhesiveness against hot water (%) | 85 | 90 | 85 | 85 |

| | (wt. parts) | | | |
|---|---|---|---|---|
| | Example I-8 | Comp. Example I-3 | Comp. Example I-4 | Comp. Example I-5 |
| NR (Natural Rubber) | 100 | 100 | 100 | 100 |
| Carbon black | 43 | 63 | 63 | 59 |
| Silica | 20 | — | — | — |
| Silane coupling agent | — | — | — | — |
| Active agent | 1.3 | — | — | — |
| Polysiloxane-1 | 2.0 | — | — | — |
| Polysiloxane-2 | — | — | — | — |
| Silicone oil | — | 2.0 | — | — |
| Aromatic oil | — | 2.0 | 8.0 | 4.0 |
| Zinc oxide | 10.0 | 10.0 | 10.0 | 10.0 |
| Antioxidant | 1.0 | 1.0 | 1.0 | 1.0 |
| Cobalt naphthenate | 3.0 | 3.0 | 3.0 | 3.0 |
| Sulfur | 8.0 | 8.0 | 8.0 | 8.0 |
| Vulcanization accelerator | 0.5 | 0.5 | 0.5 | 0.5 |
| Cresol resin | 1.0 | 1.0 | 1.0 | 1.0 |
| Partial condensate of hexamethylol melamine pentamethyl ether | 5.0 | 5.0 | 5.0 | 5.0 |
| Mooney viscosity | 60 | 61 | 58 | 59 |
| Scorching time (min) | 32 | 28 | 31 | 31 |
| Vulcanization rate (min) | 11.9 | 9.7 | 12.3 | 12.4 |
| Hs (20° C.) | 80 | — | 78 | 78 |
| tanδ (60° C.) | 0.16 | — | 0.21 | 0.19 |
| Initial adhesiveness (%) | 95 | — | 95 | 95 |
| Adhesiveness against hot water (%) | 85 | — | 80 | 80 |

Natural Rubber: RSS #1

Carbon black: Seast 300 (Tokai Carbon, $N_2SA$ 84 $m^2/g$, DBP oil absorption 75 ml/100 g)

Silica: Nipsil AQ (Nihon Silica)

Silane coupling agent: Si69 (Degussa) (chemical name: bis-[3-(triethoxylsilyl)-propyl]tetrasulfide)

Active agent: Diethylene glycol

Silicone oil: KF99 (Shinetsu Kagaku Kogyo K.K.)

Aromatic oil: Process oil X-140 (Kyodo Sekiyu)
Zinc oxide: Zinc white R (Toho Aen)
Antioxidant: Antigen 6C (Sumitomo Chemical Co.) (N-phenyl-N'-(1,3-dimethylbutyl)-p-phenylenediamine)
Cobalt naphthenate: Dainihon Ink Chemical Co. (10% by weight of Co element is contained)
Vulcanization accelerator: Accel DZ-G (Kawaguchi Chemical Ind.) (N,N'-dicyclohexyl-2-benzothiazolsulfenamide)
Sulfur: Insoluble sulfur (20% oil treatment)
Cresol resin: Sumicanol 610 (Sumitomo Chemical Co.)
Partial condensate of hexamethylol melamine penta methyl ether: Sumicanol 507 (Sumitomo Chemical Co.) (50% of said condensate is included.)

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece and the vulcanized physical properties were evaluated.

The test methods for the unvulcanized physical properties and vulcanized physical properties of the compositions obtained in each Examples were as follows:

Mooney viscosity

Measured the viscosity at 100° C. according to JIS K 6300.

Scorching time

Time for viscosity to rise 5 points at 125° C. measured according to JIS K 6300.

Vulcanization rate

Time to reach 95% vulcanization at 160° C. measured according to JIS K 6300.

Hardness (Hs)

Measured the hardness at 20° C. according to JIS K 6301 tanδ

Measured by viscoelasticity spectrometer (made by Toyo Seiki Seisakusho) at 20 Hz, initial elongation of 10%, and dynamic strain of ±2%.

Initial Adhesiveness

From the both sides of brass plated steel cords (1×5 structure) arranged in a parallel fashion with a distance of 12.5 mm, the rubber composition was filled therein by coating and the fabric having a width of 25 mm was vulcanized at 170° C.×20 mm to prepare a test sample and the rubber coating percentage (%) was evaluated by pulling out the wire according to ASTM-D-2229.

Adhesiveness against Hot Water

The decrease in the adhesiveness caused by the penetration of water from the outer damage was determined by cutting a lower end of the wire of a sample for pulling out by hand and immersing in a hot water having a temperature of 70° C. After allowing to stand for 4 weeks, the wire was pulled out from the resultant sample and the rubber coating percentage (%) was evaluated, according to ASTM-D-2229.

The following evaluation results are shown in Table III, together with the compounding compositions.

Comparative Example I-1 and I-2 are typical conventional compounding compositions.

Example I-1 to I-2 are those containing the polysiloxane, in addition to Comparative Example I-1 and, due to the addition of the polysiloxane, the decrease in the viscosity, the extension in the scorching time and the reduction in the vulcanization rate are observed and the processability are made good and, although Hs and tanδ are equivalent, the adhesiveness against water is also improved. Examples I-3 to I-6 are those containing the polysiloxane, in addition to Comparative Example I-2, the results similar to the above-mentioned results of Examples I-1 to I-2 are obtained. Examples I-7 to I-8 are those containing the silica, in addition to Example I-4, the decrease in the heat generation and the improvement in the durability are observed.

On the other hand, Comparative Example I-3 contains a silicone oil, instead of the polysiloxane of Example I-4, the rubber sheet was foamed, and therefore, this was not practically used. Furthermore, although Comparative Examples I-4–I-5 contain a further amount of the process oil, instead of the polysiloxane of Example I-4, and the amount of the carbon black is decreased so as to intend to decrease the viscosity, Hs was decreased and the durability was also decreased.

As explained above, according to the first embodiment of the present invention, since, due to the incorporation of the polysiloxane together with sulfur and cobalt into the rubber composition for coating steel cords, the viscosity of the unvulcanized rubber composition is decreased, the scorching time is extended, and the vulcanization rate is increased, the processability is largely improved, the hardness and tanδ of the vulcanized product are more than equal and the adhesiveness against water can be improved.

Example II-1 to II-6 and Comparative Examples II-1 to II-6

The polysiloxane 1 and 2 used in the present invention were synthesized according to the method described in Example I.

The other compounding components used in the compounding of the following Examples and Comparative Examples (see Table IV) were the following commercially available products.

TABLE IV

|  | Comp. Example II-1 | Example II-1 | Example II-2 | Example II-3 | Example II-4 | Example II-5 | Example II-6 | Comp. Example II-2 | Comp. Example II-3 | Comp. Example II-4 | Comp. Example II-5 | Comp. Example II-6 |
|---|---|---|---|---|---|---|---|---|---|---|---|---|
| NR | 65 | 65 | 65 | 65 | 65 | 65 | 65 | 65 | 30 | 65 | 65 | 65 |
| SBR | 25 | 25 | 25 | 25 | 25 | 25 | 25 | 25 | 60 | 25 | 25 | 25 |
| BR | 10 | 10 | 10 | 10 | 10 | 10 | 10 | 10 | 10 | 10 | 10 | 10 |
| CB-1 | 60 | 60 | 60 | 60 | 60 | 30 | 30 | 30 | 60 | — | 60 | 60 |

TABLE IV-continued

| | Comp. Example II-1 | Example II-1 | Example II-2 | Example II-3 | Example II-4 | Example II-5 | Example II-6 | Comp. Example II-2 | Comp. Example II-3 | Comp. Example II-4 | Comp. Example II-5 | Comp. Example II-6 |
|---|---|---|---|---|---|---|---|---|---|---|---|---|
| CB-2 | — | — | — | — | — | — | — | — | — | 60 | — | — |
| Silica | — | — | — | — | — | 20 | 20 | — | — | — | — | — |
| Silane coupling agent | — | — | — | — | — | 1.0 | — | — | — | — | — | — |
| Active agent | — | — | — | — | — | 1.3 | 1.3 | — | — | — | — | — |
| Polysiloxane-1 | — | 1.0 | 2.0 | 4.0 | — | 2.0 | 2.0 | — | 2.0 | 2.0 | — | — |
| Polysiloxane-2 | — | — | — | — | 2.0 | — | — | — | — | — | — | — |
| Silicone oil | — | — | — | — | — | — | — | 2.0 | — | — | — | — |
| Aromatic oil | 8.0 | 7.0 | 6.0 | 4.0 | 6.0 | 3.0 | — | 6.0 | 8.0 | 12.0 | 13.0 | 8.0 |
| Zinc oxide | 5.0 | 5.0 | 5.0 | 5.0 | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 | 1.0 | 1.0 | 1.0 | 1.0 |
| Antioxidant | 1.0 | 1.0 | 1.0 | 1.0 | 1.0 | 1.0 | 1.0 | 1.0 | 1.0 | 1.0 | 1.0 | 1.0 |
| Sulfur | 3.2 | 3.2 | 3.2 | 3.2 | 3.2 | 3.2 | 3.2 | 3.2 | 3.2 | 3.2 | 3.2 | 3.2 |
| Vulcanization accelerator | 1.2 | 1.2 | 1.2 | 1.2 | 1.2 | 1.2 | 1.2 | 1.2 | 1.2 | 1.2 | 1.2 | 1.2 |
| Mooney viscosity | 59 | 56 | 54 | 48 | 55 | 56 | 56 | 58 | 55 | 56 | 54 | 55 |
| Scorching time (min) | 29 | 30 | 31 | 32 | 31 | 31 | 32 | 28 | 33 | 28 | 31 | 31 |
| Vulcanization rate (min) | 8.1 | 7.9 | 7.6 | 7.4 | 7.7 | 7.8 | 8.0 | 6.9 | 8.6 | 7.8 | 8.3 | 8.5 |
| Hs (20° C.) | 62 | 62 | 62 | 62 | 62 | 62 | 62 | — | 62 | 62 | 59 | 59 |
| tanδ (20° C.) | 0.14 | 0.14 | 0.14 | 0.14 | 0.14 | 0.13 | 0.13 | — | 0.16 | 0.17 | 0.15 | 0.13 |

Natural Rubber: SIR-20
SBR: Nipol 1502 (Nihon Zeon)
BR: Nipol 1220 (Nihon Zeon)
Carbon black
   CB-1: Seast V (Tokai Carbon, $N_2SA$ 27 $m^2/g$)
   CB-2: Seast 300 (Tokai Carbon, $N_2SA$ 84 $m^2/g$)
Silica: Nipsil AQ (Nihon Silica)
Silane coupling agent: Si69 (Degussa) (chemical name: bis-[3-(triethoxylsilyl)-propyl]tetrasulfide)
Silicone oil: KF 99 (Shinetsu Kagaku Kogyo K.K.)
Zinc oxide: Zinc white #3 (Seido Kagaku)
Stearic acid: Lunac YA (Kao Soap Co.)
Antioxidant: Antigen 6C (Sumitomo Chemical Co.) (N-phenyl-N'-(1,3-dimethylbutyl)-p-phenylenediamine)
Sulfur: Insoluble sulfur (20% oil treatment)
Vulcanization accelerator: Nocceler CZ (Ouchi Shinko Chemical Industrial Co., Ltd.) (N-cyclohexyl-2-benzothiazylsulfenamide)

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece (rubber sheet) and the vulcanized physical properties were evaluated.

The test methods for the unvulcanized physical properties and vulcanized physical properties (Mooney viscosity, scorching time, vulcanization rate, hardness Hs and tanδ) of the composition obtained in each Example are the same methods of the above-mentioned Example I.

The following evaluation results are shown in Table IV, together with the compounding compositions. Note that Comparative Example II-1 is a typical conventional composition for carcass compounding.

Examples II-1 to II-6 are all within the range of the present invention and all provide the good results. Namely, Examples II-1 to II-4 are those containing the polysiloxane, in addition to Comparative Example II-1, the decrease in the viscosity of the unvulcanized compounding compositions and the extension of the scorch are observed and the vulcanization rate is reduced, the processability is made good, and the physical properties such as hardness and tanδ are not substantially impaired. Examples II-5 to II-6 are those containing silica, in addition to Example II-2, and therefore, the head generation is decreased and the durability is improved.

On the other hand, Comparative Example II-2 contains the silicone oil instead of the polysiloxane in Example II-2, the rubber sheet was foamed and cannot be practically used. Comparative Example II-3 contains the polymer blend which is not within the definition of the present invention, compared with Example II-2, and therefore, the heat generation is worsen (i.e., the increase in tanδ). Comparative Example II-4 contains the carbon black which is not within the definition of the present invention, compared with Example II-2, and therefore, the heat generation is worsen. Comparative Examples II-5 to II-6 are intended to decrease the viscosity by increasing the amount of the oil and decreasing the amount of the carbon black, when compared with Example II-2, it is not preferable because the hardness Hs is decreased and also because the stiffness is decreased.

As explained above, according to the second embodiment of the present invention, the decrease in the viscosity of the unvulcanized compounding composition, the desired results such as the improvement in the processability by the extension of the scorching time (prevention of the burning of the rubber in the extrusion and pressing steps, the increase in the line speed, etc.), or the improvement in the productivity by the shortening of the vulcanization step can be obtained, without impairing the physical properties of the vulcanized products such as the hardness Hs, tanδ, etc. due to the compounding 20–120 parts by weight of the specified carbon black and 10 parts by weight or less of the specified polysiloxane to 100 parts by weight of the diene rubber containing 40 parts by weight or more of natural rubber. According to the known processes, e.g., the increase in the compounding amount of a process oil and the decrease in the compounding amount of a carbon black, although the viscosity is decreased, the physical properties such as hardness are also decreased, and therefore, these properties cannot be balanced.

Thus, the rubber composition according to the present invention is suitable for use as those for carcass coat of a bus tire or for a belt cover.

Example III-1 to III-7 and Comparative Examples III-1 to III-5

The polysiloxanes used in the present invention were synthesized according to the method described in Example I.

The other compounding components used in the compounding of the following Examples and Comparative Examples (see Table V) were the following commercially available products.

TABLE V

|  | Example III-1 | Example III-2 | Example III-3 | Example III-4 | Example III-5 | Example III-6 | Example III-7 |
|---|---|---|---|---|---|---|---|
| NR | 80 | 80 | 80 | 80 | 50 | 80 | 80 |
| SBR | 20 | 20 | 20 | 20 | 50 | 20 | 20 |
| CB-1 | 70 | 70 | 70 | 70 | 68 | 50 | 50 |
| CB-2 | — | — | — | — | — | — | — |
| Silica | — | — | — | — | — | 20 | 20 |
| Silane coupling agent | — | — | — | — | — | 1.0 | — |
| Active agent | — | — | — | — | — | 1.3 | 1.3 |
| Polysiloxane-1 | 1.0 | 2.0 | 4.0 | — | 2.0 | 2.0 | 2.0 |
| Polysiloxane-2 | — | — | — | 2.0 | — | — | — |
| Silicone oil |  |  |  |  |  |  |  |
| Aromatic oil | 7.0 | 6.0 | 4.0 | 6.0 | 6.0 | 5.0 | 4.0 |
| Zinc oxide | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 |
| Antioxidant | 1.0 | 1.0 | 1.0 | 1.0 | 1.0 | 1.0 | 1.0 |
| Sulfur | 3.5 | 3.5 | 3.5 | 3.5 | 3.5 | 3.5 | 3.5 |
| Vulcanization agent | 1.0 | 1.0 | 1.0 | 1.0 | 1.0 | 1.0 | 1.0 |
| Mooney viscosity | 66 | 63 | 58 | 64 | 63 | 64 | 65 |
| Scorching time (min) | 23 | 24 | 25 | 24 | 26 | 24 | 25 |
| Vulcanization rate (min) | 7.7 | 7.5 | 7.2 | 7.6 | 7.8 | 7.6 | 7.8 |
| E' (60° C.) (MPa) | 7.3 | 7.3 | 7.3 | 7.3 | 7.3 | 7.4 | 7.3 |
| tanδ (60° C.) | 0.19 | 0.19 | 0.19 | 0.19 | 0.19 | 0.15 | 0.15 |

|  | Comp. Example III-1 | Comp. Example III-2 | Comp. Example III-3 | Comp. Example III-4 | Comp. Example III-5 |
|---|---|---|---|---|---|
| NR | 80 | 80 | 80 | 80 | 80 |
| SBR | 20 | 20 | 20 | 20 | 20 |
| CB-1 | 70 | 70 | — | 70 | 55 |
| CB-2 | — | — | 70 | — | — |
| Silica | — | — | — | — | — |
| Silane coupling agent | — | — | — | — | — |
| Active agent | — | — | — | — | — |
| Polysiloxane-1 | — | — | 2.0 | — | — |
| Polysiloxane-2 | — | — | — | — | — |
| Silicone oil | — | 2.0 | — | — | — |
| Aromatic oil | 8.0 | 6.0 | 9.0 | 23.0 | 8.0 |
| Zinc oxide | 5.0 | 5.0 | 5.0 | 5.0 | 5.0 |
| Stearic acid | 2.0 | 2.0 | 2.0 | 2.0 | 2.0 |
| Antioxidant | 1.0 | 1.0 | 1.0 | 1.0 | 1.0 |
| Sulfur | 3.5 | 3.5 | 3.5 | 3.5 | 3.5 |
| Vulcanization agent | 1.0 | 1.0 | 1.0 | 1.0 | 1.0 |
| Mooney viscosity | 69 | 66 | 72 | 59 | 60 |
| Scorching time (min) | 22 | 21 | 23 | 24 | 24 |
| Vulcanization rate (min) | 7.9 | 6.9 | 7.4 | 8.2 | 8.3 |
| E' (60° C.) (MPa) | 7.3 | — | 7.5 | 4.9 | 4.8 |
| tanδ (60° C.) | 0.19 | — | 0.22 | 0.20 | 0.17 |

Natural Rubber: SIR-20
SBR: Nipol 1502 (Nihon Zeon)
Carbon black

CB-1: Seast N (Tokai Carbon, $N_2SA$ 74 $m^2/g$)
CB-2: Diablack A (Tokai Carbon, $N_2SA$ 142 $m^2/g$)
Silica: Nipsil AQ (Nihon Silica)

Silane coupling agent: Si69 (Degussa) (chemical name: bis-[3-(triethoxylsilyl)-propyl]tetrasulfide)

Active agent: Diethyleneglycol

Silicone oil: KF 99 (Shinetsu Chemical Ind. Ltd.)

Zinc oxide: Zinc white #3 (Seido Kagaku)

Stearic acid: Lunac YA (Kao Soap Co.)

Antioxidant: Antigen 6C (Sumitomo Chemical Co.) (N-phenyl-N'-(1,3-dimethylbutyl)-p-phenylenediamine)

Sulfur: Insoluble sulfur (20% oil treatment)

Vulcanization accelerator: Nocceler NS-F (Ouchi Shinko Chemical Industrial Co., Ltd.) (N-tert-butyl-2-benzothiazolylsulfenamide)

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece (rubber sheet) and the vulcanized physical properties were evaluated.

The test methods for the unvulcanized physical properties and vulcanized physical properties are as follows:

Mooney viscosity, Scorching time, Vulcanization rate

Tested in the same methods as in Example I

E' (storage modulus) and tanδ

The measurement was carried out using viscoelasticity spectrometer (made by Toyo Seiki Seisakusho) under the conditions of a temperature of 60° C., an initial strain of 10%, a dynamic strain of ±2% and a frequency of 20 Hz.

The following evaluation results are shown in Table V, together with the compounding compositions. Note that Comparative Example III-1 is a typical conventional composition for a bead filler.

Examples III-1 to III-7 are all within the range of the present Invention and all provide the good results. Especially, Examples III-6 and III-7, in which silica is used together with carbon black, by the compounding of the polysiloxane, the decrease in the viscosity of the unvulcanized compounding composition and the extension of the scorching time were observed, the vulcanization rate is shortened, the processability and productivity are made good and, in the vulcanizate properties, tanδ is further decreased and the durability is improved, without substantially impairing E' (storage modulus). Note that Comparative Example III-2 in which the silicone oil is contained, the vulcanized rubber sheet was foamed and was not able to be practically used.

As explained above, according to the third embodiment of the present invention, by compounding 50 parts by weight or more of the specified carbon black and 0.1 to 10 parts by weight of the specified polysiloxane to 100 parts by weight of the diene rubber containing 40 parts by weight or more of natural rubber, the desired results such as the improvements in the processability by the decrease in the viscosity and the extension in the scorching time (prevention of the burning of the rubber in the extrusion and pressing steps, the increase in the line speed, etc.), or the improvement in the productivity by the shortening of the vulcanization step, without impairing the physical properties of the vulcanizate such as E' (storage modulus) and tanδ. Thus, the rubber composition according to the present invention is suitable for use as those for bead filler of tires for passenger cars, trucks and buses.

Example IV-1 to IV-10 and Comparative Examples IV-1 to IV-5

The polysiloxane 1 and 2 used in the following Examples were synthesized according to the method described in Example I.

The other compounding components used in the compounding of the following Examples and Comparative Examples (see Table VI) were the following commercially available products.

TABLE VI

| | (wt. parts) | | | | |
|---|---|---|---|---|---|
| | Comp. Example | | Example | | |
| | IV-1 | IV-2 | IV-1 | IV-2 | IV-3 |
| NR | 40 | 40 | 40 | 40 | 50 |
| BR | 60 | 60 | 60 | 60 | 50 |
| Carbon black-1 | — | — | — | — | — |
| Carbon black-2 | 50 | 30 | 30 | 30 | 30 |
| Carbon black-3 | — | — | — | — | — |
| Silica | — | 20 | 20 | 20 | 20 |
| Silane coupling agent | — | 2.0 | 1.0 | 1.0 | 1.0 |
| Polysiloxane-1 | — | — | 1.0 | 3.0 | 1.0 |
| Polysiloxane-2 | — | — | — | — | — |
| Silicone oil | — | — | — | — | — |
| Active agent | — | 1.3 | 1.3 | 1.3 | 1.3 |
| Aromatic oil | 15 | 15 | 15 | 15 | 15 |
| Zinc white | 3.0 | 3.0 | 3.0 | 3.0 | 3.0 |
| Stearic acid | 2.0 | 2.0 | 2.0 | 2.0 | 2.0 |
| Antioxidant-1 | 3.0 | 3.0 | 3.0 | 3.0 | 3.0 |
| Antioxidant-2 | 2.0 | 2.0 | 2.0 | 2.0 | 2.0 |
| Wax | 1.5 | 1.5 | 1.5 | 1.5 | 1.5 |
| Sulfur | 1.5 | 1.5 | 1.5 | 1.5 | 1.5 |
| Vulcanization agent | 1.0 | 1.0 | 1.0 | 1.0 | 1.0 |
| tanδ (60° C.) | 0.21 | 0.17 | 0.17 | 0.17 | 0.18 |
| Flex fatigue (index) | 100 | 110 | 115 | 117 | 109 |
| Mixing processability | 5 | 3 | 5 | 5 | 5 |

| | (wt. parts) Example | | | | |
|---|---|---|---|---|---|
| | IV-4 | IV-5 | IV-6 | IV-7 | IV-8 |
| NR | 40 | 40 | 40 | 40 | 40 |
| BR | 60 | 60 | 60 | 60 | 60 |
| Carbon black-1 | — | — | — | — | 30 |
| Carbon black-2 | — | 40 | 30 | 30 | — |
| Carbon black-3 | 30 | — | — | — | — |
| Silica | 20 | 10 | 20 | 20 | 20 |
| Silane coupling agent | 1.0 | 0.5 | — | 2.0 | 1.0 |
| Polysiloxane-1 | 1.0 | 0.5 | — | 2.0 | 1.0 |
| Polysiloxane-2 | — | — | 1.0 | — | — |
| Silicone oil | — | — | — | — | — |
| Active agent | 1.3 | 0.7 | 1.3 | 1.3 | 1.3 |
| Aromatic oil | 10 | 15 | 15 | 15 | 15 |
| Zinc white | 3.0 | 3.0 | 3.0 | 3.0 | 3.0 |
| Stearic acid | 2.0 | 2.0 | 2.0 | 2.0 | 2.0 |
| Antioxidant-1 | 3.0 | 3.0 | 3.0 | 3.0 | 3.0 |
| Antioxidant-2 | 2.0 | 2.0 | 2.0 | 2.0 | 2.0 |
| Wax | 1.5 | 1.5 | 1.5 | 1.5 | 1.5 |
| Sulfur | 1.5 | 1.5 | 1.5 | 1.5 | 1.5 |
| Vulcanization agent | 1.0 | 1.0 | 1.0 | 1.0 | 1.0 |
| tanδ (60° C.) | 0.14 | 0.19 | 0.17 | 0.17 | 0.22 |
| Flex fatigue (index) | 112 | 106 | 114 | 110 | 111 |

TABLE VI-continued

| Mixing processability | 5 | 5 | 5 | 5 | 5 |

| | (wt. parts) | | | | |
|---|---|---|---|---|---|
| | Comp. Example | | | Example | |
| | IV-3 | IV-4 | IV-5 | IV-9 | IV-10 |
| NR | 40 | 40 | 80 | 40 | 40 |
| BR | 60 | 60 | 20 | 60 | 60 |
| Carbon black-1 | — | — | — | — | — |
| Carbon black-2 | 30 | 30 | 30 | 50 | 50 |
| Carbon black-3 | — | — | — | — | — |
| Silica | 20 | 20 | 20 | — | — |
| Silane coupling agent | — | 1.0 | 1.0 | — | — |
| Polysiloxane-1 | — | — | 1.0 | 2.0 | 4.0 |
| Polysiloxane-2 | — | — | — | — | — |
| Silicone oil | — | 1.0 | — | — | — |
| Active agent | 1.3 | 1.3 | 1.3 | — | — |
| Aromatic oil | 15 | 15 | 15 | 13 | 11 |
| Zinc white | 3.0 | 3.0 | 3.0 | 3.0 | 3.0 |
| Stearic acid | 2.0 | 2.0 | 2.0 | 2.0 | 2.0 |
| Antioxidant-1 | 3.0 | 3.0 | 3.0 | 3.0 | 3.0 |
| Antioxidant-2 | 2.0 | 2.0 | 2.0 | 2.0 | 2.0 |
| Wax | 1.5 | 1.5 | 1.5 | 1.5 | 1.5 |
| Sulfur | 1.5 | 1.5 | 1.5 | 1.5 | 1.5 |
| Vulcanization agent | 1.0 | 1.0 | 1.0 | 1.0 | 1.0 |
| tanδ (60° C.) | 0.17 | — | 0.19 | 0.21 | 0.21 |
| Flex fatigue (index) | 96 | — | 83 | 104 | 109 |
| Mixing processability | 3 | 2 | 5 | 5 | 5 |

Natural Rubber: SIR-20 (Tg: −71° C.)

BR: Nipol 1220 (Nihon Zeon) (Tg: −106° C.)

Silica: Nipsil AQ (Nihon Silica)

Silane coupling agent: Si69 (Degussa) (chemical name: bis-[3-(triethoxylsilyl)-propyl]tetrasulfide)

Carbon black
  CB-1: Diablack A (Mitsubishi Chemical, $N_2SA$ 142 $m^2/g$ DBP oil absorption=116 ml/100 g)
  CB-2: Seast N (Tokai Carbon, $N_2SA$ 74 $m^2/g$, DBP oil absorption=101 ml/100 g)
  CB-3: Diablack E (Mitsubishi Chemical, $N_2SA$ 41 $m^2/g$ DBP=115 ml/100 g)

Silicone oil: KF 99 (Shinetsu Chemical Industries Ltd.)

Active agent: Diethyleneglycol

Wax: Sannoc (Ouchi: Shinko Chemical Industrial Co., Ltd.)

Zinc oxide: Zinc white #3 (Seido Kagaku)

Stearic acid: Lunac YA (Kao Soap Co.)

Antioxidant-1: Antigen 6C (Sumitomo Chemical Co.) (N-phenyl-N'-(1,3-dimethylbutyl)-p-phenylenediamine)

Antioxidant-2: Antigen RD (Sumitomo Chemical Co.) (poly-(2,2,4-trimeltyl-1,2-dihydroquinoline)

Vulcanization accelerator: Nocceler CZ (Ouchi Shinko Chemical Industrial Co., Ltd.) (N-cyclohexyl-2-benzothiazylsulfenamide)

Sulfur: A 5% oil treated powder sulfur

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece (rubber sheet) and the vulcanized physical properties were evaluated.

The test and evaluation methods for the composition in each Example are as follows.

tanδ (60° C.)

Measured by viscoelasticity spectrometer (made by Toyo Seiki Seisakusho) at 60° C. initial strain of 10%, dynamic strain of ±2%, and 20 Hz. As the value becomes smaller, the hysteresis less tends to decrease and the rotating resistance of a tire can be decreased.

Flexfatigue

The measurement was carried out until the failure using a fatigue test machine (made by Monsanto Co.) by a method according to ASTM-D-4482 except that the condition of a distortion rate of 120%. The number of times until the failure was shown indexed to that of Comparative Example IV-1 as 100. The larger the value, the better the anti-flexfatigue.

Mixing Processability

The kneading performance and sheeting properties of the blended rubber, the dispersion conditions of carbon black/silica were visually evaluated by mixing under the mixing method and mixing conditions similar to those when preparing the above-mentioned samples and evaluated by 5 point full mark (i.e., point 5: best).

The evaluation results are shown in Table VI, together with the compounding composition.

Comparative Example IV-1 is an example of the typical conventional compound for a side tread, Comparative Example IV-2 contains the silica and the coupling agent, in addition to Comparative Example IV-1 as a base, but the processability is not sufficient. Examples IV-1 to IV-6 exhibit the decrease in the heat generation (tanδ), good flex fatigue property, and no problem in the processability. Example IV-7 containing only the polysiloxane (i.e., no coupling agent), compared with Example IV-1, exhibits a minor decrease in the flex fatigue, but no problem in the processability. Comparative Example IV-3 containing neither the polysiloxane nor the coupling agent exhibits the poor flex fatigue and processability. Comparative Example IV-4 containing the silicone oil, in addition to the composition of Example IV-1, exhibits that the rubber sheet was foamed and was not able to practically used. Comparative Example IV-5 contains the polymer blend which is not within the definition of the polymer of the present invention, when compared with Example IV-1, and therefore, exhibits the poor flex fatigue property. Comparative Example IV-6 contains the carbon black, which is not within the definition according to the present invention, when compared with Example IV-1, and exhibits the poor heat generation. Examples IV-9 and IV-10 according to the present invention are those containing no silica, when compared with Comparative Example IV-1, and exhibit good flex fatigue property, without impairing the processability and the heat generation.

As explained above, according to the fourth embodiment of the present invention, the rolling resistance of the vulcanizate can be decreased and the flex resistance can be increased, as a rubber composition for a tire tread, without substantially causing a change for the worse in the mixing processability and the dispersibility.

Examples V-1 to V-7 and Comparative Examples V-1 to V-5

The polysiloxanes used in the present invention were synthesized according to the method described in Example I.

The other compounding components used in the compounding of the following Examples and Comparative Examples (see Table VII) were the following commercially available products.

Mooney Viscosity, Scorching Time and Vulcanization Rate

The tests were carried out in the same procedures as those of Example I.

TABLE VII

| | Comp. Example V-1 | Example V-1 | Example V-2 | Example V-3 | Example V-4 | Example V-5 | Example V-6 | Example V-7 | Comp. Example V-2 | Comp. Example V-3 | Comp. Example V-4 | Comp. Example V-5 |
|---|---|---|---|---|---|---|---|---|---|---|---|---|
| IIR | 75 | 75 | 75 | 75 | 75 | 55 | 75 | 75 | 75 | 75 | 75 | 75 |
| NR | 25 | 25 | 25 | 25 | 25 | 45 | 25 | 25 | 25 | 25 | 25 | 25 |
| CB-1 | 60 | 60 | 60 | 60 | 60 | 60 | 30 | 30 | 60 | — | 60 | 50 |
| CB-2 | — | — | — | — | — | — | — | — | — | 60 | — | — |
| Silica | — | — | — | — | — | — | 20 | 20 | — | — | — | — |
| Silane coupling agent | — | — | — | — | — | — | 1.0 | — | — | — | — | — |
| Active Agent | — | — | — | — | — | — | 1.3 | 1.3 | — | — | — | — |
| Polysiloxane-1 | — | 1.0 | 2.0 | 4.0 | — | 2.0 | 2.0 | 2.0 | — | 2.0 | — | — |
| Polysiloxane-2 | — | — | — | — | 2.0 | — | — | — | — | — | — | — |
| Silicone oil | — | — | — | — | — | — | — | — | 2.0 | — | — | — |
| Aromatic oil | 4.0 | 3.0 | 2.0 | — | 2.0 | 3.0 | 1.0 | — | 2.0 | 7.0 | 9.0 | 4.0 |
| Zinc oxide | 3.0 | 3.0 | 3.0 | 3.0 | 3.0 | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 | 1.0 | 1.0 | 1.0 | 1.0 | 1.0 |
| Sulfur | 0.8 | 0.8 | 0.8 | 0.8 | 0.8 | 0.8 | 0.8 | 0.8 | 0.8 | 0.8 | 0.8 | 0.8 |
| Vulcanization agent | 1.0 | 1.0 | 1.0 | 1.0 | 1.0 | 1.0 | 1.0 | 1.0 | 1.0 | 1.0 | 1.0 | 1.0 |
| Mooney viscosity | 66 | 64 | 61 | 57 | 62 | 62 | 62 | 63 | 65 | 65 | 62 | 62 |
| Scorching time (min) | 19 | 20 | 21 | 22 | 21 | 22 | 21 | 22 | 18 | 20 | 20 | 21 |
| Vulcanization rate (min) | 17.9 | 17.3 | 17.1 | 16.8 | 17.2 | 16.4 | 17.2 | 17.4 | 16.1 | 17.3 | 18.4 | 18.6 |
| E' (MPa) (60 C°) | 3.0 | 3.0 | 3.0 | 3.0 | 3.0 | 3.0 | 3.1 | 3.1 | — | 3.0 | 2.6 | 2.5 |
| tanδ (60° C.) | 0.18 | 0.18 | 0.18 | 0.18 | 0.18 | 0.17 | 0.16 | 0.16 | — | 0.21 | 0.19 | 0.17 |

Butyl rubber IIR: Brominated isobutyrene isoprene rubber (Exxon Bromobutyl Rubber 2244)

Natural rubber NR: SIR-20

Carbon black
  CB-1: Seast V (Tokai Carbon, $N_2SA$ 27 $m^2/g$)
  CB-2: Seast 300 (Tokai Carbon, $N_2SA$ 84 $m^2/g$)

Silica: Nipsil AQ (Nihon Silica)

Silane coupling agent: Si69 (Degussa) (chemical name: bis-[3-(triethoxylsilyl)-propyl]tetrasulfide)

Silicone oil: KF99 (Shinetsu Chemical Industries Ltd.)

Aromatic oil: Process oil X-140 (Kyodo Sekiyu)

Zinc oxide: Zinc white #3 (Seido Kagaku)

Stearic acid: Lunac YA (Kao Soap Co.)

Sulfur: Oil treated sulfur

Vulcanization accelerator: Suncellar DM (Sanshin Chemical) (Dibenzothiazyldisulfide)

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece (rubber sheet) and the vulcanized physical properties were evaluated.

The test methods for the unvulcanized physical properties and vulcanized physical properties are as follows.

E' (Storage Modulus) and tanδ

The tests were carried out in the same procedures as those of Example I.

The following evaluation results are shown in Table VII, together with the compounding compositions. Note that Comparative Example V-1 is a typical conventional compounding composition for an inner liner.

Examples V-1 to V-7 are compounding compositions within the scope of the present invention and all provides the good results. Namely, Examples V-1 to V-5 are those containing the polysiloxane with respect to Comparative Example V-1 and the decrease in the viscosity and the extension of the scorching time of the unvulcanized compounding composition are observed and the vulcanization rate is shortened, the processability becomes good, without substantially impairing the physical properties of the vulcanizate of E' (storage modulus) and tanδ. Examples V-6 and V-7 are those containing the silica, in addition to that of Example V-2, and the heat generation is decreased and it is preferable from the viewpoint of the durability.

On the other hand, Comparative Example V-2 contains silicone oil, instead of the polysiloxane of Example V-2, the rubber sheet was foamed, and therefore, this was not practically used. Comparative Example V-3 uses the polymer blend, which is the outside of the definition thereof in the present invention, when compared with Example V-2, and therefore, the heat generation becomes worse (i.e., the increase in tanδ). Comparative Examples V-4 to V-5 contain the increased amount of the process oil and the decreased amount of the carbon black, when compared with Example V-2, so as to intend to decrease the viscosity, but this is not preferable from the viewpoint of the durability because E' (storage modulus) is decreased.

As explained above, according to the fifth embodiment of the present invention, the desired results such as the decrease in the viscosity of the unvulcanized compounding composition, the improvement in the processability by the extension of the scorching time (prevention of the burning of the rubber in the extrusion and pressing steps, the increase in the line speed, etc.), or the improvement in the productivity by the shortening of the vulcanization step can be obtained, without impairing the physical properties of the vulcanized products such as E' (storage modulus), tanδ, etc. due to the compounding 20–120 parts by weight of the specified carbon black and 10 parts by weight or less of the specified polysiloxane to 100 parts by weight of the rubber component containing 50 parts by weight or none of butyl rubber and 50 parts by weight or less of diene rubber. Thus, the rubber composition according to the present invention is suitable for use as those for an inner liner of a tire for a passenger car, truck, bus.

Examples VI-1 to VI-5 and Comparative Examples VI-1 to VI-8

The polysiloxanes used in the present invention were synthesized according to the method described in Example I.

The other compounding components used in the compounding of the following Examples and Comparative Examples (see Table VIII) were the following commercially available products.

Stearic acid: Lunac YA (Kao Soap)

Sulfur: Insoluble sulfur (20% oil treatment)

Vulcanization accelerator: Nocceler-NS-F (Ouchi Shinko Chemical Industrial Co., Ltd.) (N-tert-butyl-2-benzothiazolyl-sulfenamide)

Preparation of Samples

The components other than the vulcanization accelerator and the sulfur were mixed in a closed type mixer for more than 3 minutes. The vulcanization accelerator and sulfur were kneaded by an open roll to the master batch which was discharged from the mixer when reaching 165±5° C. to obtain the rubber composition. The unvulcanized physical properties of the rubber composition thus obtained were measured.

The composition was then pressed and vulcanized in a 15×15×0.2 cm mold at 160° C. for 20 minutes to prepare the intended test piece (rubber sheet) and the vulcanized physical properties were evaluated.

The test methods for the unvulcanized physical properties and vulcanized physical properties are as follows.

Mooney viscosity, Scorching time, Vulcanization rate, Hardness Hs

Measurements were carried out in the same procedures as those of Example I.

Tearing strength at break (TB) and Elongation at break (EB)

The tensile strength at break (TB) and the elongation at break (EB) were determined at a temperature of 25° C. according to JIS-K6301.

TABLE VIII

|  | Comparative Example | | Example | | | | | | Comparative Example | | |
| --- | --- | --- | --- | --- | --- | --- | --- | --- | --- | --- | --- |
|  | VI-1 | VI-2 | VI-1 | VI-2 | VI-3 | VI-4 | VI-5 | VI-6 | VI-3 | VI-4 | VI-5 |
| NR | 70 | 70 | 70 | 70 | 70 | 70 | 70 | 70 | 70 | 70 | 70 |
| SBR | 30 | 30 | 30 | 30 | 30 | 30 | 30 | 30 | 30 | 30 | 30 |
| Carbon black | 80 | 80 | 80 | 80 | 80 | 80 | 80 | 80 | 80 | 80 | 80 |
| Clay-1 | 50 | — | 50 | 50 | 50 | 50 | 50 | — | 50 | 50 | 50 |
| Clay-2 | — | 40 | — | — | — | — | — | 40 | — | — | — |
| Silane coupling agent | — | — | — | — | — | — | 3.0 | — | — | — | — |
| Polysiloxane-1 | — | — | 1.0 | 2.0 | 4.0 | — | 2.0 | 2.0 | — | — | — |
| Polysiloxane-2 | — | — | — | — | — | 2.0 | — | — | — | — | — |
| Silicone oil | — | — | — | — | — | — | — | — | 2.0 | — | — |
| Aromatic oil | 10.0 | 10.0 | 9.0 | 8.0 | 6.0 | 8.0 | 8.0 | 8.0 | 8.0 | 15.0 | 10.0 |
| Zinc oxide | 3.0 | 3.0 | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 | 2.0 | 2.0 |
| Sulfur | 5.0 | 5.0 | 5.0 | 5.0 | 5.0 | 5.0 | 5.0 | 5.0 | 5.0 | 5.0 | 5.0 |
| Vulcanization accelerator | 1.0 | 1.0 | 1.0 | 1.0 | 1.0 | 1.0 | 1.0 | 1.0 | 1.0 | 1.0 | 1.0 |
| Mooney viscosity | 54 | 57 | 52 | 50 | 45 | 51 | 51 | 52 | 54 | 51 | 52 |
| Scorching time (min) | 24 | 22 | 25 | 26 | 27 | 26 | 25 | 25 | 23 | 25 | 25 |
| Vulcanization rate (min) | 9.3 | 9.2 | 9.1 | 9.0 | 8.8 | 9.0 | 8.8 | 9.0 | 8.5 | 9.5 | 9.4 |
| Hs (20° C.) | 76 | 77 | 76 | 76 | 76 | 76 | 77 | 77 | — | 73 | 74 |
| TB (MPa) | 14.2 | 16.0 | 14.2 | 14.2 | 14.1 | 14.2 | 14.9 | 16.1 | — | 13.9 | 14.0 |
| EB (%) | 270 | 260 | 275 | 280 | 285 | 275 | 285 | 270 | — | 295 | 285 |

Natural Rubber: RSS #3

SBR: Nipol 1502 (Nihon Zeon)

Carbon black: Seast V (Tokai Carbon)

Silane coupling agent: Si69 (Degussa) (chemical name: bis-[3-(triethoxylsilyl)-propyl]tetrasulfide)

Silicone oil: KF 99 (Shinetsu Kagaku Kogyo K.K.)

Aromatic oil: Process oil X-140 (Kyodo Sekiyu)

Zinc oxide: Zinc white #3 (Seido Kagaku)

The following evaluation results are shown in Table VIII, together with the compounding compositions. Note that Comparative Example VI and VII are typical conventional compositions containing clay.

Examples VI to VI-4 are those containing the polysiloxane in addition to Comparative Example VI-1, the vulcanized physical properties of the hardness, the tensile strength and the elongation are comparative or more, with respect to Comparative Example VI-1, and the decrease in the viscosity, the extension of the scorching time and the shortening of the vulcanization rate are observed and the improvement in the processability is also observed. Example VI-5 contains the coupling agent, in addition to Example VI-2, and therefore, the improvements in the hardness, the tensile strength and the elongation are observed. Example VI-6 additionally contains the polysiloxane according to the present invention, when compared with Comparative Example VI-2, and therefore, the results similar to those of Examples VI-1 to VI-4 are observed.

On the other hand, Comparative Example VI-3 contains the silicone oil with respect to Example VI-2, and the rubber sheet was foamed and therefore was not able to be practically used. Comparative Examples VI-4 to VI-5 are those containing the increased amount of the oil and the decreased amount of the carbon black, compared with the Example, for the intention of decreasing the viscosity, but this is not preferable because the hardness and the tensile strength are also decreased although the viscosity is decreased.

As explained above, according to the sixth embodiment of the present invention, the desired results such as the decrease in the viscosity of the unvulcanized compounding composition, the improvement in the processability by the extension of the scorching time (prevention of the burning of the rubber in the extrusion and pressing steps, the increase in the line speed, etc.), or the improvement in the productivity by the shortening of the vulcanization step can be obtained, without impairing the physical properties of the vulcanized products such as the hardness, the tensile strength TB etc. due to the compounding of the polysiloxane to the clay-containing rubber composition. Thus, the resultant clay-containing rubber composition according to the present invention is suitable for use as a rubber composition for bead insulation or while side tread of a tire for a passenger car, truck or bus.

What is claimed is:

1. A rubber composition for a tire comprising:
   100 parts by weight of a starting rubber;
   10 to 150 parts by weight of a carbon black;
   0.1 to 20 parts by weight of a sulfur; and
   0.01 to 40 parts by weight or less of a polysiloxane having the following alkoxysilyl group (I) or acyloxysilyl group (II) and having an average degree of polymerization of 3 to 10,000:

 (I)

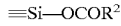 (II)

wherein $R^1$ is a substituted or unsubstituted monovalent hydrocarbon group or an organic group containing an ether bond and having 1 to 18 carbon atoms and $R^2$ is hydrogen or a hydrocarbon group having 1 to 21 carbon atoms.

2. A rubber composition for covering a steel cord as claimed in claim 1, wherein the starting rubber is 100 parts by weight of a diene rubber containing 40 parts by weight or more of natural rubber and the amount of the polysiloxane is 0.01 to 10 parts by weight.

3. A rubber composition as claimed in claim 2, wherein 0 to 2 parts by weight, in terms of a Co element, of a cobalt salt of an organic acid is contained in the composition.

4. A rubber composition as claimed in claim 2 or 3, wherein the composition further comprises 1.0 to 5 parts by weight of partial self-condensation product of hexamethylolmelamine pentamethyl ether and 0.5 to 5 parts by weight of a cresol resin.

5. A rubber composition for a carcass or belt cover as claimed in claim 1, wherein the starting rubber is 100 parts by weight of a diene rubber containing 40 parts by weight or more of natural rubber, the carbon black is 20 to 120 parts by weight of a carbon black having a nitrogen specific surface area of no more than 60 m²/g and the amount of the polysiloxane is 0.01 to 10 parts by weight.

6. A rubber composition for a tire bead filler as claimed in claim 1, wherein the starting rubber is 100 parts by weight of a diene rubber containing 40 parts by weight or more of natural rubber, the carbon black is 50 parts by weight or more of a carbon black having a nitrogen specific surface area of no more than 100 m²/g, and the amount of the polysiloxane is no more than 10 parts by weight.

7. A rubber composition for a tire side tread as claimed in claim 1, wherein the starting rubber is 100 parts by weight of a diene rubber containing 40 parts by weight or more of polybutadiene, 5–50 parts by weight of silica and 10–60 parts by weight of carbon black are included in the total amount of the silica and the carbon black is 20–80 parts by weight, and the polysiloxane having at least 6 alkoxy groups or at least 2 acyloxy groups directly bonded to the Si atom in the molecule thereof and having an average degree of polymerization of 3–10,000 in an amount of 0.01 40% by weight based upon the amount of the silica.

8. A rubber composition as claimed in claim 7, wherein no more than 40% by weight, based upon the amount of the silica, of a silane coupling agent is further contained.

9. A rubber composition as claimed in claim 7 or 8, wherein the carbon black has a nitrogen specific surface area ($N_2SA$) of no more than 100 m²/g and a DBP oil absorption of 70 ml/100 g or more.

10. A rubber composition for an inner liner rubber as claimed in claim 1, wherein the starting rubber is 100 parts by weight of a rubber component containing 50 parts by weight or more of butyl rubber and no more than 50 parts by weight of a diene rubber, the carbon black is 20 to 120 parts by weight of a carbon black having a nitrogen surface area of no more than 60 m²/g, and the amount of the polysiloxane is 0.01 to 10 parts by weight.

11. A clay compounding rubber composition as claimed in claim 1, wherein 5 to 100 parts by weight, based upon 100 parts by weight of the starting rubber, of clay and the amount of the polysiloxane is 0.01 40% by weight based upon the amount of the clay.

12. A process for applying a rubber composition according to claim 1 for covering a steel cord of a tire.

13. A process as claimed in claim 12, wherein the starting rubber is 100 parts by weight of a diene rubber containing 40 parts by weight or more of natural rubber and the amount of the polysiloxane is 0.01 to 10 parts by weight.

14. A process as claimed in claim 12, wherein 0 to 2 parts by weight, in terms of a Co element, of a cobalt salt of an inorganic acid is contained in the composition.

15. A process as claimed in claim 12, wherein the composition further comprises 1.0 to 5 parts by weight of partial self-condensation product of hexamethylolmelamine pentamethyl ether and 0.5 to 5 parts by weight of a cresol resin.

* * * * *

UNITED STATES PATENT AND TRADEMARK OFFICE
CERTIFICATE OF CORRECTION

PATENT NO. : 6,103,811

DATED : August 15, 2000

INVENTOR(S) : MIDORIKAWA et al.

It is certified that error appears in the above-identified patent and that said Letters Patent is hereby corrected as shown below:

On the Title Page

Item [54], please delete --POLYSILOCANE-CONTAINING TIRE RUBBER COMPOSITION--, and insert POLYSILOXANE-CONTAINING RUBBER COMPOSITION FOR TIRE.

Signed and Sealed this

Tenth Day of April, 2001

Attest:

NICHOLAS P. GODICI

Attesting Officer        Acting Director of the United States Patent and Trademark Office